United States Patent [19]

Bando et al.

[11] Patent Number: 5,265,002
[45] Date of Patent: * Nov. 23, 1993

[54] FAULT PROTECTION FOR A MULTIPHASE BRIDGE POWER CONVERTER

[75] Inventors: Akira Bando; Chikara Tanaka; Keiji Saito, all of Hitachi; Tadao Kawai, Katsuta; Eizo Kita, Kyoto; Keiichi Mitsuhashi, Hikone; Yasuteru Oono, Kobe; Hiroto Nakagawa, Osaka, all of Japan

[73] Assignees: Hitachi, Ltd., Tokyo; The Kansai Electric Power Co., Inc., Osaka, both of Japan

[*] Notice: The portion of the term of this patent subsequent to Mar. 24, 2009 has been disclaimed.

[21] Appl. No.: 757,334

[22] Filed: Sep. 10, 1991

[30] Foreign Application Priority Data

Sep. 10, 1990 [JP] Japan .................. 2-239548

[51] Int. Cl.⁵ .............................. H02H 7/125
[52] U.S. Cl. ........................ 363/54; 363/87; 363/129
[58] Field of Search ............ 363/53, 54, 58, 85, 363/87, 129

[56] References Cited

U.S. PATENT DOCUMENTS

| | | | |
|---|---|---|---|
| 4,429,357 | 1/1984 | Hausler et al. | 363/51 |
| 4,670,827 | 6/1987 | Schneider | 363/129 |
| 4,757,435 | 7/1988 | Wood et al. | 363/54 |
| 4,812,729 | 3/1989 | Ito et al. | 363/57 |
| 5,099,409 | 3/1992 | Bando et al. | 363/54 |

FOREIGN PATENT DOCUMENTS 0388850 9/1990 European Pat. Off. .

Primary Examiner—J. L. Sterrett
Attorney, Agent, or Firm—Antonelli, Terry, Stout & Kraus

[57] ABSTRACT

A semiconductor power conversion system comprising a multiphase bridge circuit which includes semiconductor devices having a controllable firing function and a reverse blocking characteristic, a gate control circuit which gives firing commands to the semiconductor devices, a short circuiting switch in which switching devices having a controllable firing function and a reverse blocking characteristic are connected in parallel with a DC output side of the multiphase bridge circuit, and a protection control device for performing a control for protecting the multiphase bridge circuit. The protection control device includes a device for detecting a commutation failure of the multiphase bridge circuit, and a device in response to the detection of the commutation failure for producing a blocking command for blocking the firing of the semiconductor devices of the multiphase bridge circuit and producing a short-circuiting command for firing the switching device which is short-circuited which bypasses current of the commutation failure. The protection control device further includes a device for detecting ending of a short-circuit based on the ceasing of current conduction of the short circuiting switch and for halting the blocking of the firing of the semiconductor devices of the multiphase bridge circuit.

12 Claims, 12 Drawing Sheets

140 ···· DETECTING FUNCTION SECTION

141 ···· DIFFERENCE DETECTING CIRCUIT 142, 143, 146 ···· COMPARATORS

144 ···· OVERCURRENT DETECTOR

150 ···· CONTROL SIGNAL OUTPUT FUNCTION SECTION

140 ···· DETECTING FUNCTION SECTION
141 ···· DIFFERENCE DETECTING CIRCUIT
142,143,146 ···· COMPARATORS
150 ···· CONTROL SIGNAL OUTPUT FUNCTION SECTION

140 ···· DETECTING FUNCTION SECTION

141 ···· DIFFERENCE DETECTING CIRCUIT 142,143,147 ···· COMPARATORS

150 ···· CONTROL SIGNAL OUTPUT FUNCTION SECTION

140 ···· DETECTING FUNCTION SECTION
141 ···· DIFFERENCE DETECTING CIRCUIT
142,146,148,149 ···· COMPARATORS
150 ···· CONTROL SIGNAL OUTPUT FUNCTION SECTION

7b HIGHEST VALUE SELECTING CIRCUIT

FAULT PROTECTION FOR A MULTIPHASE BRIDGE POWER CONVERTER

BACKGROUND OF THE INVENTION

1. Field of the Invention

The present invention relates to a semiconductor power conversion system which is used for AC-to-DC conversion, DC power transmission, frequency conversion, etc. in the fields of electric power systems, electric railways, large-scaled plants, etc. More particularly, it relates to a semiconductor power conversion system which is well suited for, e.g., a variable speed generator/motor that needs to continue running perfectly even in a case where an AC input voltage has fluctuated due to an abnormality of the electric power system or a case where the load of a DC output side is an inductive circuit, so an overvoltage develops due to a current source operation.

2. Description of the Prior Art

In a case where a conventional semiconductor power conversion apparatus of the line commutation type is applied to equipment with the intention of enhancing the stability of an electric power system, there is a problem as stated below:

Since the thermal capacities of semiconductor devices for electric power, such as thyristors, are smaller than those of transformers, rotary electric machines etc., the protective operation in the event of any abnormal accruing is inevitably designed to be highly sensitive. With the semiconductor power conversion apparatus, therefore, the operation thereof must sometimes be interrupted in consideration of the protection of the power semiconductor devices even when the disturbance of the electric power system side is slight. Herein, once the operation of the apparatus of this type has been interrupted, it cannot be restarted until various items are inspected and confirmed to be secure and safe. Accordingly, the time period for the interruption becomes long, and the apparatus cannot satisfactorily contribute to the enhancement of the stability of the electric power system.

A prior-art apparatus for solving such a problem is disclosed in the official gazette of Japanese Patent Application Laid-open No. 52699/1988.

FIG. 10 is a connection diagram showing the circuit arrangement of the prior-art example. The illustrated semiconductor power conversion apparatus is so constructed that electric power is fed from an AC system 1 to a three phase bridge circuit 3 through a power transformer 2.

Referring to the figure, the apparatus includes current transformers 5 for detecting three-phase AC input current values, a DC current transformer 6 for detecting a DC side output current value, and an input current detector circuit 7.

Besides, it includes a subtractor 6a for finding the difference between the output Iac of the input current detecting circuit 7 and the output Idc of the DC current transformer 6, an absolute value calculating circuit 8 for finding the absolute value of the output of the subtractor 6a, a differential current detector 9, an overcurrent detector 10, and an operation continuation deciding unit 11.

The output Iac of the input current detecting circuit 7 representing an input current value and the output current value Idc from the DC current transformer 6 are equal during the steady operation of the conversion apparatus. A signal ΔI obtained by rectifying the difference of both the current values by means of the absolute value calculating circuit 8, is applied to the differential current detector 9, while the input current value Iac is applied to the overcurrent detector 10.

The operation continuation deciding unit 11 has logic functions as indicated in detail in FIG. 12.

Referring to FIG. 12, if the output signal OC of the overcurrent detector 10 is "0" (step 100), the output current of the three-phase bridge circuit 3 is decided to be normal (step 104), and an operation continuation command G01 is output (step 107) so as to continue the steady operation.

However, even when the output signal OC of the overcurrent detector 10 is "0", processing for a return to the normal operation of the conversion apparatus (step 109) is required in the case where the normal operation is to be restarted after the return of the apparatus from the output of a suppression control command G02. To this end, it must be decided whether or not the overcurrent suppression control command G02 was recently delivered (step 108). Subject to the delivery of the command G02, the return processing (step 109) is executed, and the operation continuation command G01 is thereafter outputted (step 107).

Here, the contents of the return processing (step 109) are as follows: i) In the state of the conversion apparatus before the detection of the overcurrent, some of the calculated results of a control unit (not shown) for controlling the gates of the individual thyristors of the three-phase bridge circuit 3 are initialized on the basis of circuit currents at present. ii) The present firing conditions of forward and backward thyristors TYS are sensed by the control unit, and these thyristors are initialized.

On the other hand, if the output signal OC of the overcurrent detector 10 is "1" (step 100), the value of the output signal ΔI of the absolute value calculating circuit 8 is further decided (step 101). If the signal ΔI is below an allowable value K1 and nothing is wrong with a generator, then the overcurrent is decided to be attributable to a power system fault or an interrupted operation in another power conversion apparatus (steps 110, 103), and the overcurrent suppression control command G02 is output to the control unit (step 106).

The thyristor short-circuiting switch TYS is fired in compliance with the overcurrent suppression control command G02, thereby suppressing the current of the three-phase bridge circuit 3. Incidentally, the output of the suppression control command G02 is recorded by a flip-flop circuit (not shown) or the like in order to prepare for the processing required when returning to the normal operation (step 109).

Besides, in a case where the value of the output signal ~I of the absolute value calculating circuit 8 is equal to or above the allowable value K1 (step 101), the overcurrent is decided to be attributable to an internal fault of the three-phase bridge circuit 3 (step 102), and an operation emergency stop command ST is output (step 105).

The firing signals of the thyristors TY1-TY6 of the three-phase bridge circuit 3 are forcibly blocked in compliance with the operation emergency stop command ST.

Here, even in case of an internal fault in another piece of equipment, the signal ΔI might fall below the allowable value K1. Therefore, whether such an internal fault is present is decided upon after the decision of the step 101 and step 110. In the presence of the internal fault of the other equipment (step 111), the operation emergency stop command ST is outputted in the same manner as in the case of the internal fault of the power conversion apparatus (step 105) without carrying out the overcurrent suppression control.

With the prior-art technique, in detecting the abnormality of the power conversion apparat is not satisfactorily made between an abnormality attributable to the fault or damage in any equipment and an abnormality, such as commutation failure or overvoltage, caused under the influence of a fluctuation on the AC system side or the DC side. For example, even in the abnormality of the commutation failure attributable to the external fluctuation, the conversion apparatus is subjected to an emergency stop when the overcurrent signal OC has become "1" with the signal ΔI reaching the allowable value K1. This causes the problem that the operating reliability of the conversion apparatus cannot be ensured.

SUMMARY OF THE INVENTION

The first object of the present invention is to provide a semiconductor power conversion system which is easy to restart even in the case where the operation of a multiphase bridge cannot be continued due to a commutation failure attributable to an external fluctuation.

The second object of the present invention is to provide a semiconductor power conversion system which is easy to restart even in a case where the operation of a multiphase bridge cannot be continued due to an overvoltage developed on a DC output side by an external fluctuation.

In order to accomplish the first object, according to one aspect of the present invention, there is provided a semiconductor power conversion system comprising: a multiphase bridge circuit which includes semiconductor devices having a controllable firing function and a reverse blocking characteristic, a gate control circuit which gives firing commands to said semiconductor devices, a short-circuiting switch in which switching devices having a controllable firing function and a reverse blocking characteristic are connected in a reverse parallel relationship to each other and are connected in parallel with a DC output side of said multiphase bridge circuit, and protection control means for performing a control for protecting said multiphase bridge circuit; said protection control means including: means for detecting a commutation failure of said multiphase bridge circuit; and means for operating upon the detection of the commutation failure, to produce a blocking command for blocking the firing of said semiconductor devices of said multiphase bridge circuit and to produce a short-circuiting command for firing that one of said switching devices constituting said short-circuiting switch which bypasses current of the commutation failure.

In order to accomplish the second object of the present invention, according to another aspect thereof, there is provided a semiconductor power conversion system comprising: a multiphase bridge circuit which includes semiconductor devices having a controllable firing function and a reverse blocking characteristic, a gate control circuit which gives firing commands to said semiconductor devices, a short-circuiting switch in which switching devices having a controllable firing function and a reverse blocking characteristic are connected in a reverse parallel relationship to each other and are connected in parallel with a DC output side of said multiphase bridge circuit, and protection control means for performing a control for protecting said multiphase bridge circuit; said protection control means including means for detecting an overvoltage on the DC side of said multiphase bridge circuit, and means for operating upon the detection of the overvoltage, to produce a blocking command for blocking the firing of said semiconductor devices of said multiphase bridge circuit and to produce a short-circuiting command for firing that one of said switching devices constituting said short circuiting switch in which the overvoltage forms a forward voltage.

In each of the above aspects. said protection control means can further include means for ending of a short-circuit based on an expiration of current conduction of said short-circuiting switch and for halting the blocking of the firing of said semiconductor devices of said multiphase bridge circuit.

The protection control means can further include means for detecting a fault within said system (an internal fault) attributed to either of said multiphase bridge circuit and a firing command loop therefor; and means for operating upon the detection of the internal fault, in order to produce a blocking command for blocking the firing of said semiconductor devices constituting said multiphase bridge circuit and to produce a short-circuiting command for firing those of said switching devices constituting said short-circuiting switch which are bidirectional.

Next, the operation of the present invention will be described by taking a power conversion system having a three-phase bridge circuit as an example.

In the three-phase bridge of the power conversion circuit, as shown in FIG. 13, two of six arms are usually conducting current in the six combinations of TY1 and TY2, TY2 and TY3, TY3 and TY4, TY4 and TY5, TY5 and TY6 and TY6 and TY1. In the case of FIG. 13, the current is being conducted in the combination of the two arms TY1 and TY2. FIG. 14 illustrates the commutation from TY1 to TY3.

Among the malfunctions of the power conversion circuit, the phenomenon of a commutation failure is caused by a voltage fall on the AC side of the circuit or a transient current from the DC side thereof even when no internal fault occurs in the circuit. Regarding such a commutation failure attributable to external factors, the normal operation of the circuit can be resumed therefrom when the external fluctuation has diminished.

FIG. 15 shows an operating example on the occasion of the commutation failure as stated above. In the illustrated example, before a commutation from the TY3 to the TY5 terminates, the TY6 is fired to initiate a commutation from the TY4 to the TY6.

At this time, $Iu = -I1 + If$, $Iv = I1 - It - If$, and $Iw = It$. In FIG. 15, the commutation current If at the lower stage approximates the current IQ, but the commutation current It at the upper stage decreases to zero again because the potential of the v-phase becomes higher than that of the w-phase. Therefore, the AC side is opened, and all of the currents Iu, Iv and Iw become zero.

As a result, a short-circuit composed of TY3 and TY6 is formed on the DC side as shown in FIG. 16, so that a direct current ldc remains at 11 and does not become zero.

Since the current flows continuously through TY3 and TY6 constituting the short-circuit, the semiconductor devices TY3 and TY6 might be destroyed due to the temperature rise thereof.

In order to prevent this drawback, a firing command is given to only the TSP having the same polarity as those of the TY1-TY6, in the TSP and TSN. constituting the short-circuiting switch in FIG. 17. As a result, the short-circuiting current 11 is bypassed to the short-circuiting switch side. Herein, the bypass to the short-circuiting switch side is ensured by a design in which the forward voltage drop of the thyristor on the short-circuiting switch side is smaller than a device forward voltage drop on the three-phase bridge side (in the example of FIG. 17, the sum of the forward voltage drops of the TY3 and TY6). Moreover, the three-phase bridge circuit is reliably opened by forcibly blocking the firing command for the TY1-TY6 as soon as the firing command is given to the short-circuiting switch.

When the current 11 on the DC circuit side has become zero in accordance with the external fluctuation, the opening of the short-circuiting switch is detected, and a blocking command previously applied to the three-phase bridge is ceased enabling the resumption of the steady operation.

According to the above series of operations, when the three-phase bridge is to be fired again, a short-circuit is not formed between it and the short-circuiting switch, and the steady operation can be reliably resumed.

On the other hand, in the case of the internal fault, in order to stop the three-phase bridge circuit quickly, the blocking command is given to turn off the TY1-TY6. Since, in this case, a current on the DC circuit side is not always zero or above, both the TYP and TYN of the short-circuiting switch are fired, to thereby reliably form a bypass circuit.

According to the present invention, in a line commutation type power conversion apparatus, the interruption/continuation of the operation of the apparatus can be done with the fault of an equipment distinguished from an abnormality attributable to an external fluctuation. This enhances the reliability of the operation.

According to the present invention, even in a case where a commutation failure has occurred due to an external fault and where the operation must be interrupted on account of the temperature rise of devices, the devices are bypassed using only a necessary short-circuiting switch, and the operation is thereafter restarted. Therefore, a time period for the interruption can be shortened, and the restart can be safely done to enhance the reliability of the operation.

DETAILED DESCRIPTION OF THE PREFERRED EMBODIMENTS

Embodiments of the present invention are described in detail with reference to the drawings. Although examples each employing a three phase bridge circuit will be described in the ensuing embodiments, the present invention is not restricted thereto.

Figure 1:
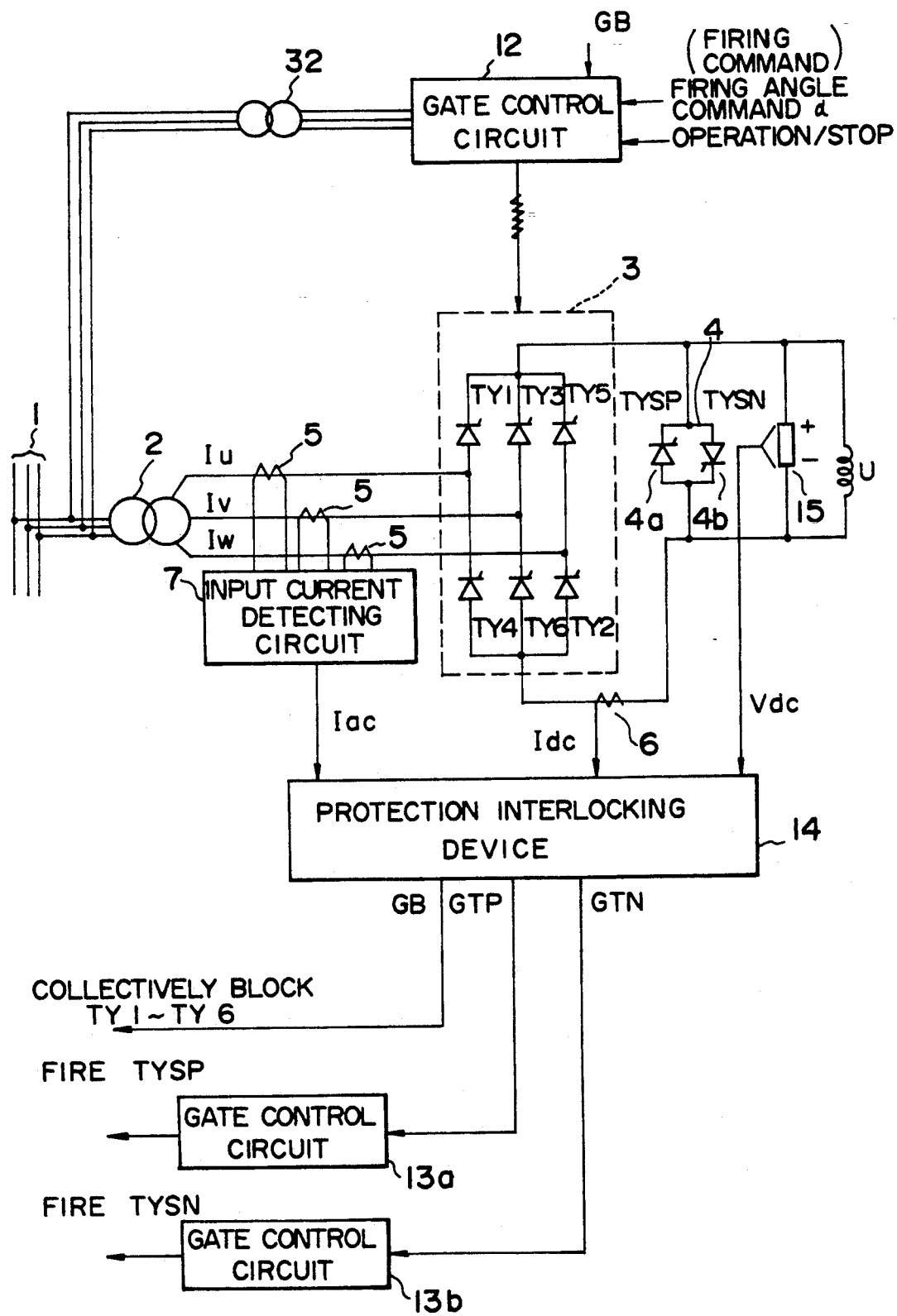
FIG. 1 is a circuit diagram showing the construction of the first embodiment of the present invention.

FIG. 1 shows the construction of the first embodiment of a semiconductor power conversion system according to the present invention.

The system of the embodiment illustrated in FIG. 1 is so constructed that electric power is fed from an AC system 1 to a three-phase bridge circuit 3 through a power transformer 2. A protection interlocking device 14 is connected to an input current detecting circuit 7 which senses the three phase current and to the bridge circuit 3.

The three-phase bridge circuit 3 is so arranged that thyristors (hereinbelow, sometimes abbreviated to "TY") TY1-TY6 are used as have a controllable firing function and a reverse blocking characteristic, and are connected in the form of a bridge. A gate control circuit (firing command circuit) 12 which controls firing of the individual thyristors TY1-TY6, is connected to the gates of the thyristors.

The gate control circuit 12 is supplied with AC signals which are applied through a synchronous transformer 32. The gate control circuit is also supplied with control signals which are firing angle commands and operation/stop commands.

On the DC side of the three-phase bridge circuit 3, a short-circuiting switch 4 is connected in parallel thereto. The short-circuiting switch 4 is so arranged that two thyristors are used as semiconductor devices which have a controllable firing function and a reverse blocking characteristic. The two thyristors ar connected in a reverse parallel relationship to each other as short-circuiting switches (hereinbelow, sometimes abbreviated to "TYSP" and "TYSN") 4a and 4b. Gate control circuits 13a and 13b are respectively connected to switches 4a, and 4b so as to control their on/off operation.

Each of the switches 4a and 4b used is such that its impedance in its "on" state is lower than the combined impedance of a path which is to be short-circuited in the bridge of the thyristors TY1-TY6.

The first embodiment comprises current transformers 5 which detect three-phase AC input current values, a DC current transformer 6 which detects the DC side output current value Idc, an input current detecting circuit 7 which finds the absolute values of the three-phase AC input current values and detects the maximum value Iac and a DC voltage transformer 15 which detects the DC side output voltage value Vdc.

The protection interlocking device 14 supplies the gate control circuit 12 with a blocking command GB as a signal for controlling the operation/stop of the thyristors TY1-TY6. Likewise, it supplies the short-circuiting command circuits 13a and 13b with short-circuiting commands GTP and GTN for the thyristor short-circuiting switches 4a and 4b, respectively. The protection interlocking device 14 is part of a protection control means for the three-phase bridge circuit 3, along with the current transformers 5, DC current transformer 6, input current detecting circuit 7 and DC voltage transformer 15.

Figure 11:
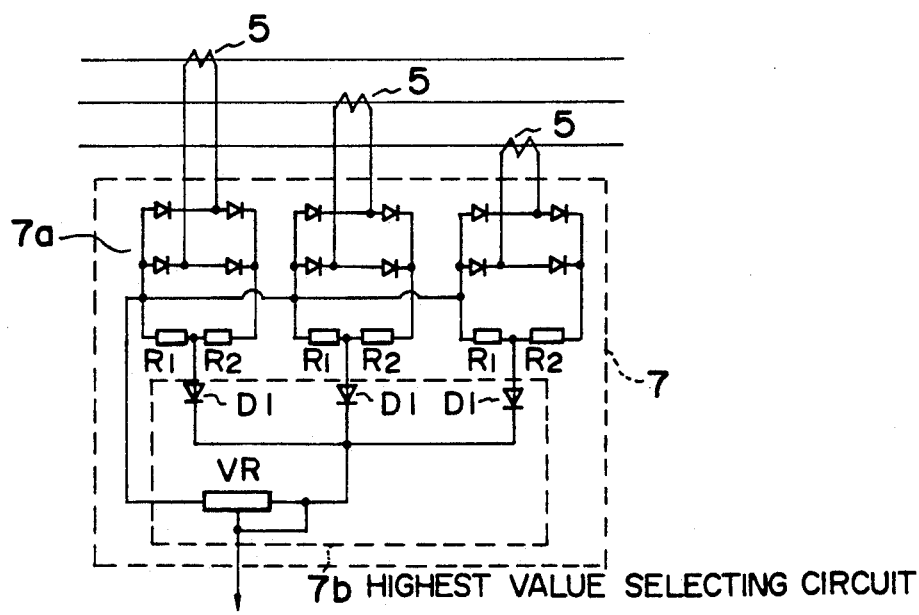
FIG. 11 is a circuit diagram showing an example of an input current detecting circuit which can be used in the present invention.
Figure 12:
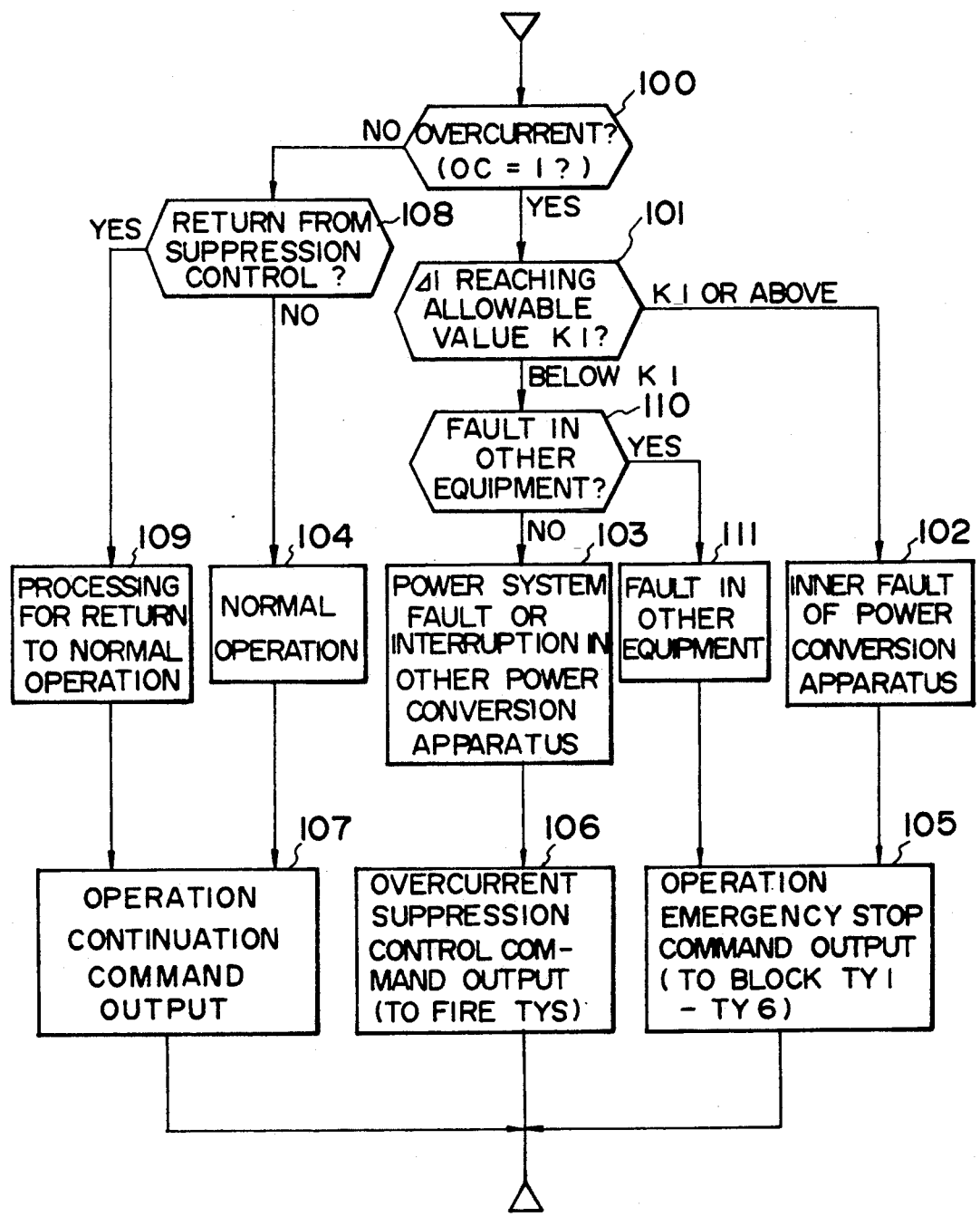
FIG. 12 is a flow chart showing the processing flow of a protective operation in the prior-art semiconductor power conversion apparatus.
Figure 13:
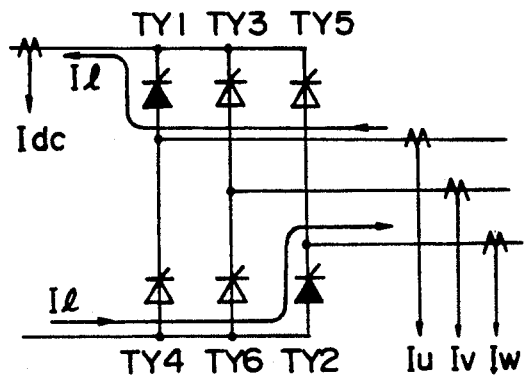
FIGS. 13 thru 17 are diagrams for explaining the operation of the present invention.
Figure 14:
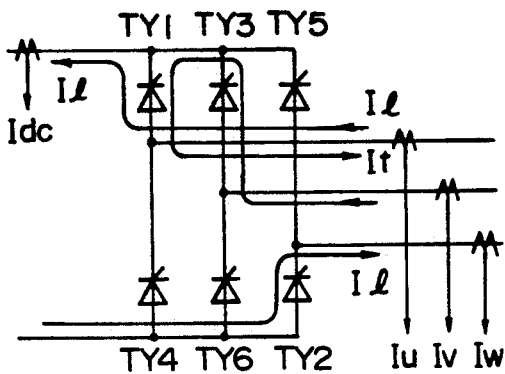
Figure 15:
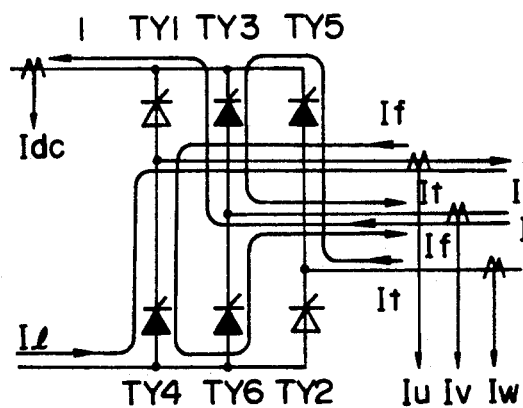

For example, a circuit arrangement shown in FIG. 11 can be used as input current detecting circuit 7. As illustrated in the FIG. 11, the input current detecting circuit 7 is so arranged that the current signals received from the current transformers 5 are respectively rectified by rectifier circuits 7a into the absolute values, which are all applied to a highest value selecting circuit 7b having diodes DI and a variable resistor VR.

Photo-CTs, for example, can be employed as the current transformers 5. They are favorable especially in a case where direct currents sometimes flow in the three-phase currents Iu, Iv and Iw transiently.

Next, an example of the protection interlocking device 14, which is well suited to the present invention including this embodiment, will be described with reference to FIG. 2.

Figure 2:
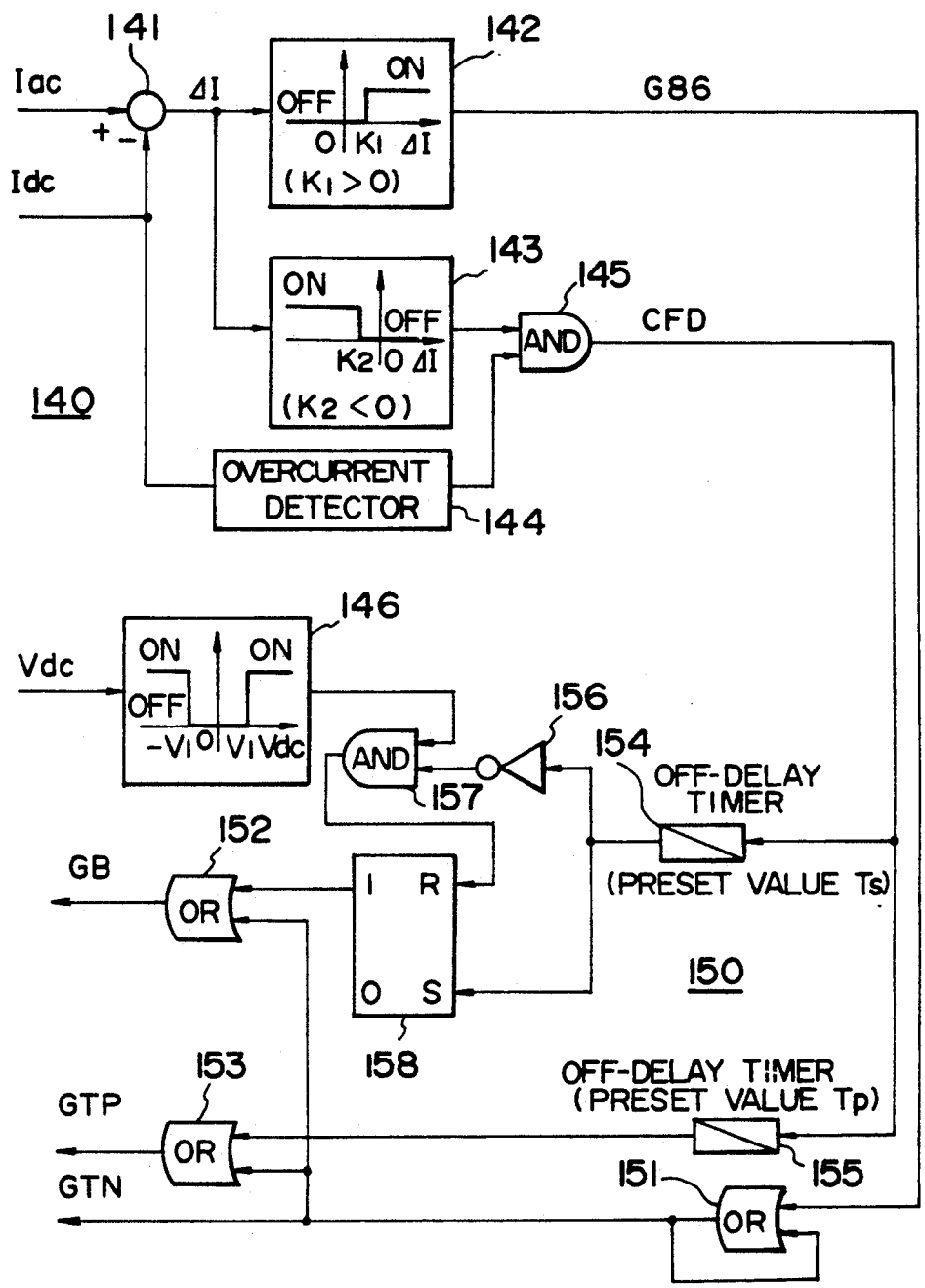
FIG. 2 is a block diagram showing an example of a protection interlocking device which is suited to the first embodiment.

FIG. 2 functionally shows the construction of the protection interlocking device in this embodiment.

The protection interlocking device of this embodiment includes a detecting function section 140 which detects an internal fault, etc., and a control signal output function section 150 which produces control signals, such as a blocking command, by the use of the detected results.

The detecting function section 140 includes a difference detecting circuit 141 which detects the difference $\Delta I$ between an AC input current Iac and a direct current Idc, a comparator 142 with a sign, which produces an internal fault detection signal G86 when the difference $\Delta I$ is greater than a preset value K1, a comparator 143 with a sign, which is turned "on" when the difference $\Delta I$ is smaller than a minus preset value K2, an overcurrent detector 144 which produces an overcurrent detection signal when the direct current Idc is an overcurrent, an AND circuit 145 which takes the logical product between the output of the comparator 143 and that of the overcurrent detector 144, and a comparator 146 which is turned "on" when the absolute value of a DC side voltage Vdc is equal to or greater than a preset value V1.

The AND circuit 145 produces a commutation failure detection signal CFD when the comparator 143 is "on", and simultaneously, the overcurrent of the direct current Idc has been detected by the overcurrent detector 144.

The comparator 142 functions as an internal fault detector. Collectively, the comparator 143, overcurrent detector 144 and AND circuit 145 function as a computation failure detector. Further, the comparator 146 functions as a detector of the ending of a short-circuit.

The preset value K1 of the comparator 142 is a value which is set for preventing this comparator from malfunctioning due to a measurement error or noise involved in the preceding stage. Accordingly, an appropriate value is set dependant upon the apparatus to-be handled. Ideally, the value K1 becomes a value near to zero. In effect, therefore, the comparator 142 detects that Iac>Idc holds.

Also, regarding the preset value K2 of the comparator 143, an appropriate value is set for the same reason. In effect, accordingly, the comparator 143 detects that Iac<Idc.

The preset value V1 of the comparator 146 needs to be greater than the forward voltage drop of the thyristor 4a constituting the short-circuiting switch 4 in FIG. 1.

The overcurrent detector 144 decides whether or not the direct current Idc has a magnitude which, when this current flows into the three-phase bridge circuit 3 in case of a commutation failure, could damage any of the thyristors TY1-TY6 included in the path of the bridge circuit. The decision can be made by considering, for example, only the value of the current Idc, or the time period of the inflow of the current Idc into the three-phase bridge 3, along with the current value.

The control signal output function section 150 includes a holding circuit 151 which is connected to the output node of the comparator 142 and which holds the internal fault detection signal G86 delivered from the comparator 142 and produces it as a short-circuiting command GTN, an off-delay timer 154 of preset value Ts and an off-delay timer 155 of preset value Tp which are connected to the output node of the AND circuit 145, an inverter 156 which inverts the output of the off-delay timer 154, an AND circuit 157 which takes the logical product between the output of the inverter 156 and that of the comparator 146, a flip-flop circuit 158 which is set by the output of the off-delay timer 154 and which is reset by the output of the AND circuit 157, an OR circuit 152 which takes the logical sum between the output of the flip-flop circuit 158 and that of the holding circuit 151 so as to produce a blocking command GB, and an OR circuit 153 which takes the logical sum between the output of the off-delay timer 155 and that of the holding circuit 151 and produces it as a short-circuiting command GTP.

The semiconductor power conversion system shown in FIG. 1, employing the protection interlocking device 14 thus far described, operates as stated below.

The three-phase bridge circuit 3 has the thyristors TY1-TY6 fired successively under the control of the gate control circuit 12 and in the combinations of the arms as stated before. Thus, it converts the AC currents Iu, Iv and Iw received through the transformer 2, into direct currents and feeds a load U with DC electric power.

At this time, the input currents Iu, Iv and Iw are respectively detected by the AC current transformers 5, and the one which has the maximum absolute value is detected and produced as the AC in current Iac by the input current detecting circuit 7.

The direct current Idc on the output side of the three-phase bridge circuit 3 is detected by the DC current transformer 6. Further, the DC voltage Vdc on the output side of the three-phase bridge circuit 3 is detected by the DC voltage transformer 15.

The AC input current Iac and the DC output current Idc are applied to the difference detecting circuit 141. The DC output current Idc is also applied to the overcurrent detecting circuit 144. Further, the DC voltage Vdc is applied to the comparator 146.

The difference detecting circuit 141 evaluates the difference $\Delta I$ between the AC input current Iac and the DC output current Idc, and sends it to the comparators 142 and 143. In the comparator 142, the difference $\Delta I$ is compared with the preset value K1. Here, if $\Delta I > K1$ is true, the comparator 142 is turned "on" to produce the internal fault detection signal G86. On the other hand, the comparator 143 is turned "on" if $\Delta I < K2$ is true. The "on" output of the comparator 143 is delivered as the commutation failure detection signal CFD from the AND circuit 145, under the condition that the output of the overcurrent detector 144 is also "on".

The internal fault is detected when $\Delta I > K1$ which is based on the following reasoning: If the three-phase bridge circuit 3 is normally operating, the values of the AC input current Iac and DC output current Idc become equal even during the commutation, and therefore $\Delta I < K1$. However, Iac > is true in a case where a short-circuit fault attributable to the semiconductor device has occurred in the arms of the three-phase bridge circuit 3, a case where another circuit has been developed within the three-phase bridge circuit 3 by any cause, and so forth. Accordingly, when the condition $\Delta I > K1$ is encountered in consideration of the measurement error etc., the internal fault of the three-phase bridge circuit 3 is detected.

The commutation failure is detected when the $\Delta I < K2$ and the detection of the overcurrent by the overcurrent detector 144 occurs based on the following reasoning: Even in the absence of any internal fault, commutation failure arises due to a voltage fall on the AC side or a transient current on the DC side. In this case, the relation of Idc > Iac is true. At the time of a commutation failure, the direct current on the DC side flows as a short-circuit current into a short-circuit occurring within the three-phase bridge circuit 3. However, considering the facts that, when this current is small, it does not cause the semiconductor devices to malfunction, and that, when the external fluctuation has become small, the commutation failure attributable to the external factor can return to normal commutation, the operation of the bridge circuit 3 should preferably be maintained as it is. Accordingly, in the aforementioned case where $\Delta I < K2$ is true and where the current Idc has been detected as the overcurrent, the commutation failure detection signal CFD is produced.

When delivered from the comparator 142, the internal fault detection signal G86 is held by the holding circuit 151. Subsequently, this signal is outputted as the short-circuiting command GTN directly from the holding circuit 151, as the short-circuiting command GTP through the OR circuit 153, and as the blocking command GB through the OR circuit 152.

When delivered from the AND circuit 145, the commutation failure detection signal CFD is held for the preset time period Ts by the off-delay timer 154, and it sets the flip-flop circuit 158. The output of this flip flop circuit 158 is forwarded as the blocking command GB.

The preset time period Ts is set to be, at least, longer than the turn-off time of each of the thyristors TY1–TY6, whereby the commutation failure is terminated without failure.

Simultaneously, the commutation failure detection signal CFD is held for the preset time period Tp by the off-delay timer 155, and it is outputted as the short-circuiting command GTP for short-circuiting the thyristor 4a. The preset time period Tp is set to be longer than the sum of the turn-on time of the short-circuiting switch 4a and the operation delay time of the gate control circuit 13a, whereby the short-circuiting operation is initiated without failure.

The blocking command GB is sent to the gate control circuit 12 shown in FIG. 1, and functions in this case to collectively block the firing of the thyristors TY1–TY6. When the blocking command GB is removed the gate control circuit 12 begins to fire the individual thyristors TY1–TY6 again.

Figure 16:
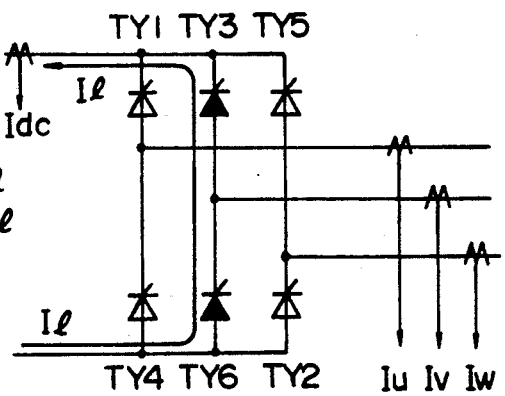
Figure 17:
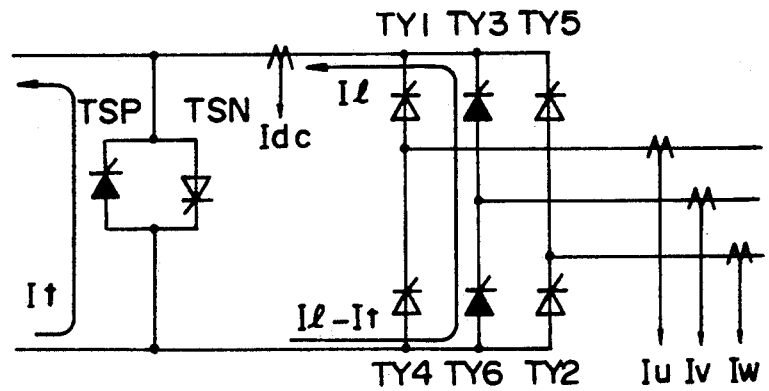

Regarding the short-circuiting commands GTP and GTN, only the command GTP is given in the case of the detection of the commutation failure, and GTP and GTN are given when the fault detection signal G86 has been output. The reasons for this are as follows: Regarding the commutation failure, since the short-circuit current flows in the forward direction of the two arms of the thyristors TY1–TY6 as shown in FIG. 16 referred to before, the short-circuiting thyristor switch 4a arranged in the same direction needs to be turned "on" in order to bypass this current, and when the thyristor switch 4b in the reverse direction is turned "on", an unnecessary short-circuit is formed, and the re-firing of the three-phase bridge 3 becomes dangerous. During an internal fault, short-circuit currents can develop in both the directions in some situations, so that both the short-circuiting thyristor switches TYSP 4a and TYSN 4b need to be turned "on".

In all embodiment, the impedance of each of the thyristors 4a and 4b of the short-circuiting switch 4 is set to be lower than the series impedance of the thyristors TY1–TY6 which are parallel to the switching thyristor during the fault. Therefore, when the short-circuiting switch 4 is turned "on", the short-circuit current flows through the switches 4a or 4b without failure, and a bypass circuit is reliably established. Accordingly, any worsening of the three phase bridge circuit fault is prevented.

Next, the comparator 146 is turned "on" when the absolute value of the DC side voltage signal Vdc is the preset value V1 or above. The preset value V1 is set to be greater than the forward voltage drop of the switch 4a constituting the short-circuiting switch 4. Therefore, when the absolute value of the DC side voltage signal Vdc has exceeded the value V1 due to the turn-off of the thyristor 4a in response to the turn-off of the short-circuiting command GTP, an ending of a short-circuit detection signal as the output of the comparator 146 is produced. The ending of a short-circuit detection signal is applied to the AND circuit 157 which resets the flip-flop circuit 158 in conjunction with the "off" state of the off-delay timer 154.

Thus, the blocking command GB produced upon the detection of the commutation failure is terminated. The commutation failure, if temporary, is followed by normal operation being quickly resumed.

The second embodiment is constructed as shown in FIG. 1 similarly to the first embodiment, except that the construction of a protection interlocking device 14 is different. Here, the point of difference will be chiefly described with reference to FIG. 3.

Figure 3:
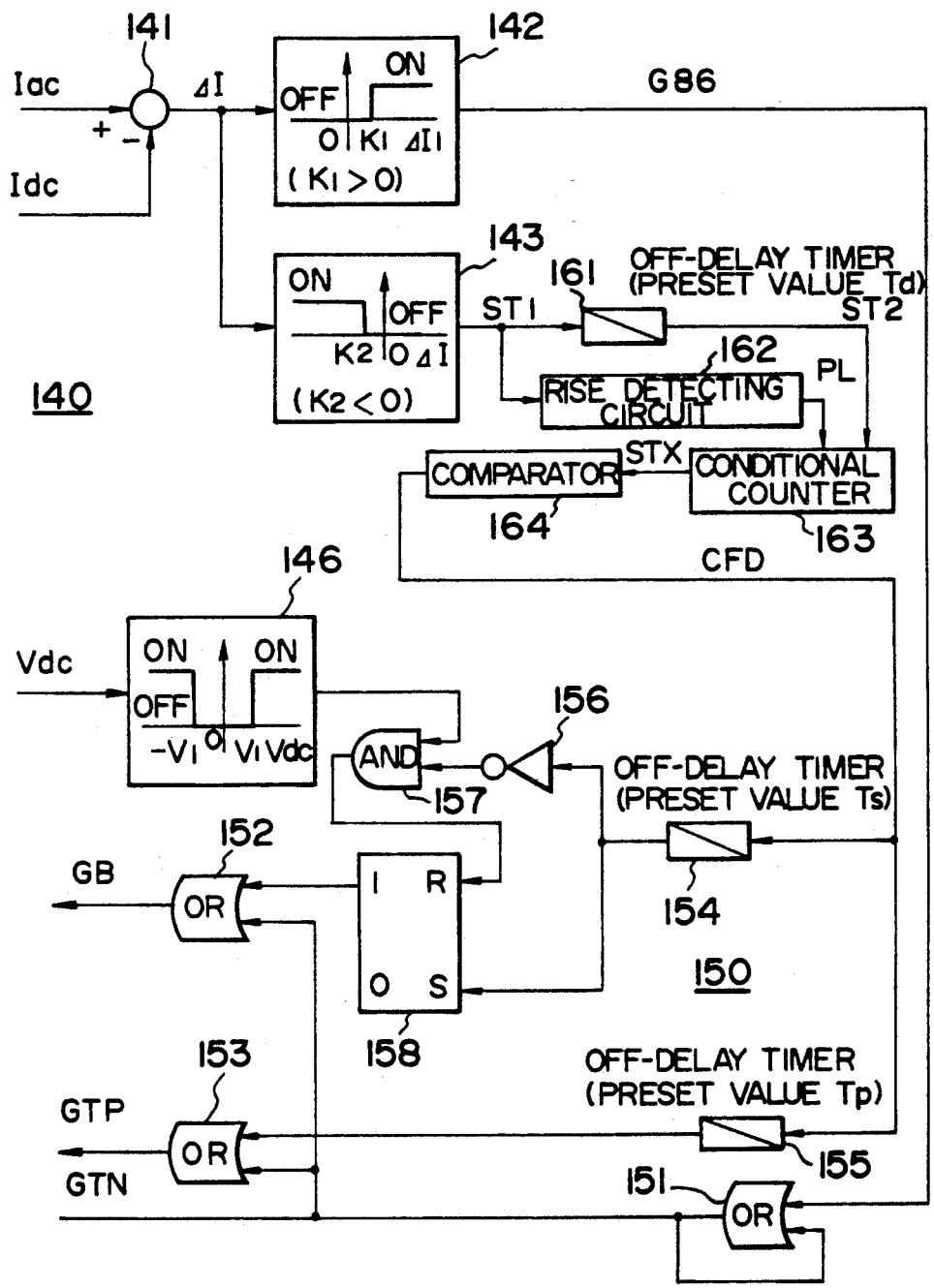
FIG. 3 is a block diagram showing an example of a protection interlocking device which is suited to the construction of the second embodiment of the present invention.

FIG. 3 shows the construction of an example of the protection interlocking device 14 which is suited to this embodiment.

The protection interlocking device 14 the second embodiment differs from the foregoing device shown in FIG. 2, in the constituents which function as a commutation failure detector. Accordingly, emphasis shall be put on this difference in the following explanation.

In FIG. 3, the commutation failure detector is constructed having a comparator 143 which is identical in construction shown in FIG. 2, an off-delay timer 161, a rise detecting circuit 162, a conditional counter 163, and a comparator 164.

The conditional counter 163 is subject to the condition of forceable reset to zero when the output signal ST2 of the off-delay timer 161 is "0". This conditional counter 163 counts the number of occurrences of the PL signal from the rise detecting circuit 162 for a time period during which the output signal ST2 has the high level "1". The resulting count value STX indicates the extent of temperature rise of any two of the thyristors of the three phase bridge circuit 3 which is attributable to a short circuit current flowing through these devices during the time period specified by the signal ST2.

That is, the count value STX serves as the estimated value of the device temperature of the two thyristors.

Figure 4:
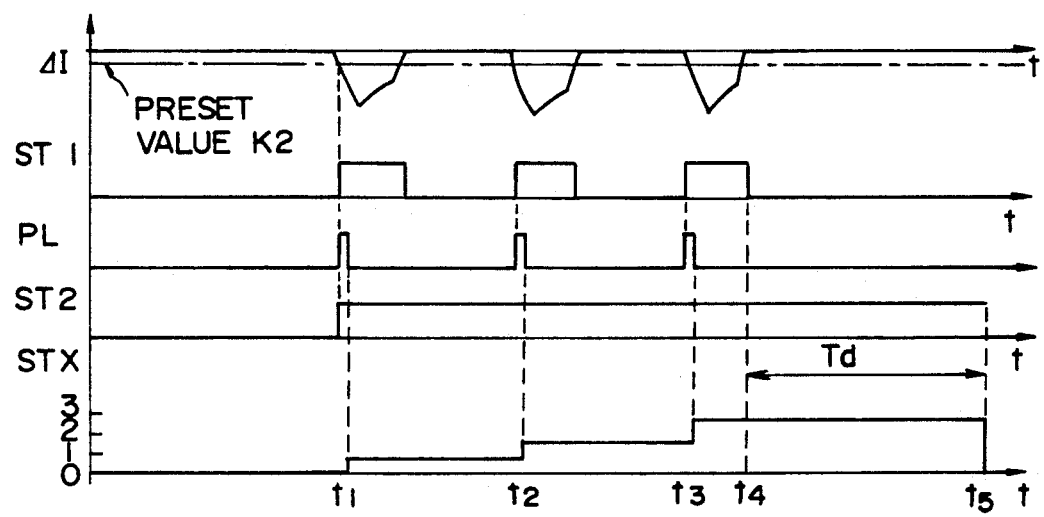
FIG. 4 is a waveform diagram showing the operation of the first embodiment.

Next, the operation of this embodiment will be described with reference also to FIG. 4. FIG. 4 is a waveform diagram showing the operation of the commutation failure detector illustrated in FIG. 3.

When the difference ΔI has become smaller than the preset value K2, the comparator 143 brings its output signal ST1 to the "high" level. This signal ST1 is applied to the off-delay timer 161 and the rise detecting circuit 162. The output signal PL from the rise detecting circuit 162 and the signal ST2 from the timer 161 are applied to the conditional counter 163. In conditional counter 163, the number of occurrences of the signal PL is counted while the output signal ST2 remains at the "high" level. The counted result STX is delivered to the comparator 164.

When the signal STX has reached a present value, which is set in the comparator 164, comparator 164 generates a commutation failure detection signal CFD upon determination that the estimated value of the device temperature of the thyristors has exceeded a preset limit.

As illustrated in FIG. 4, the counter output STX rises one by one at times t1, t2 and t3. Since, however, the output ST1 of the comparator 143 remains at the level "0" from time t4 on, the output ST2 of the off delay timer 161 falls to the level "0" at a time t5 after Td seconds (the preset value of this timer 161), so that at time t5 the counter 163 is reset to the same status as before time t1.

According to this embodiment, the commutation failure detection can be done on the basis of the estimated value of the device temperature of the thyristors.

Figure 5:
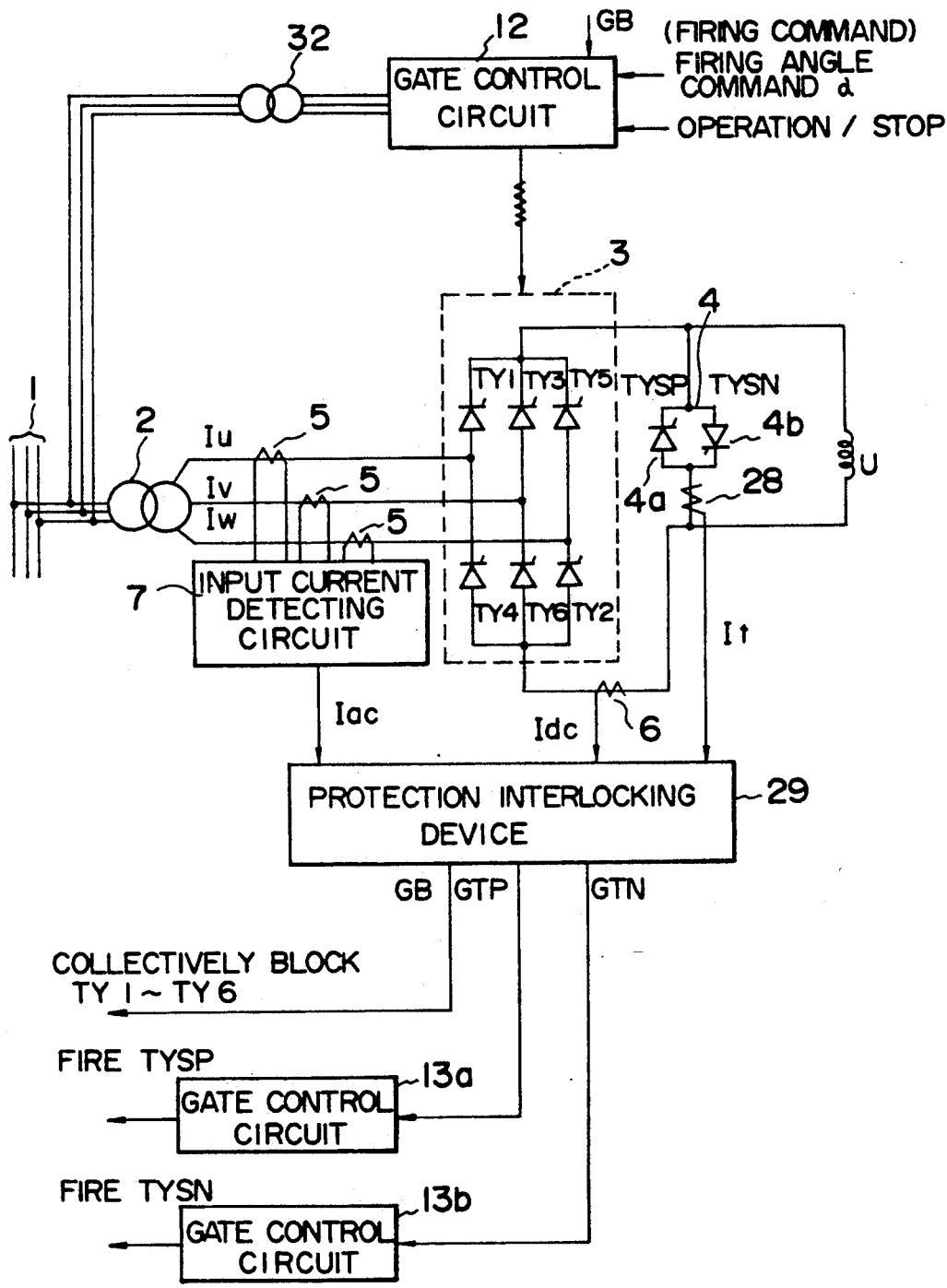
FIG. 5 is a circuit diagram showing the construction of the third embodiment of the present invention.
Figure 6:
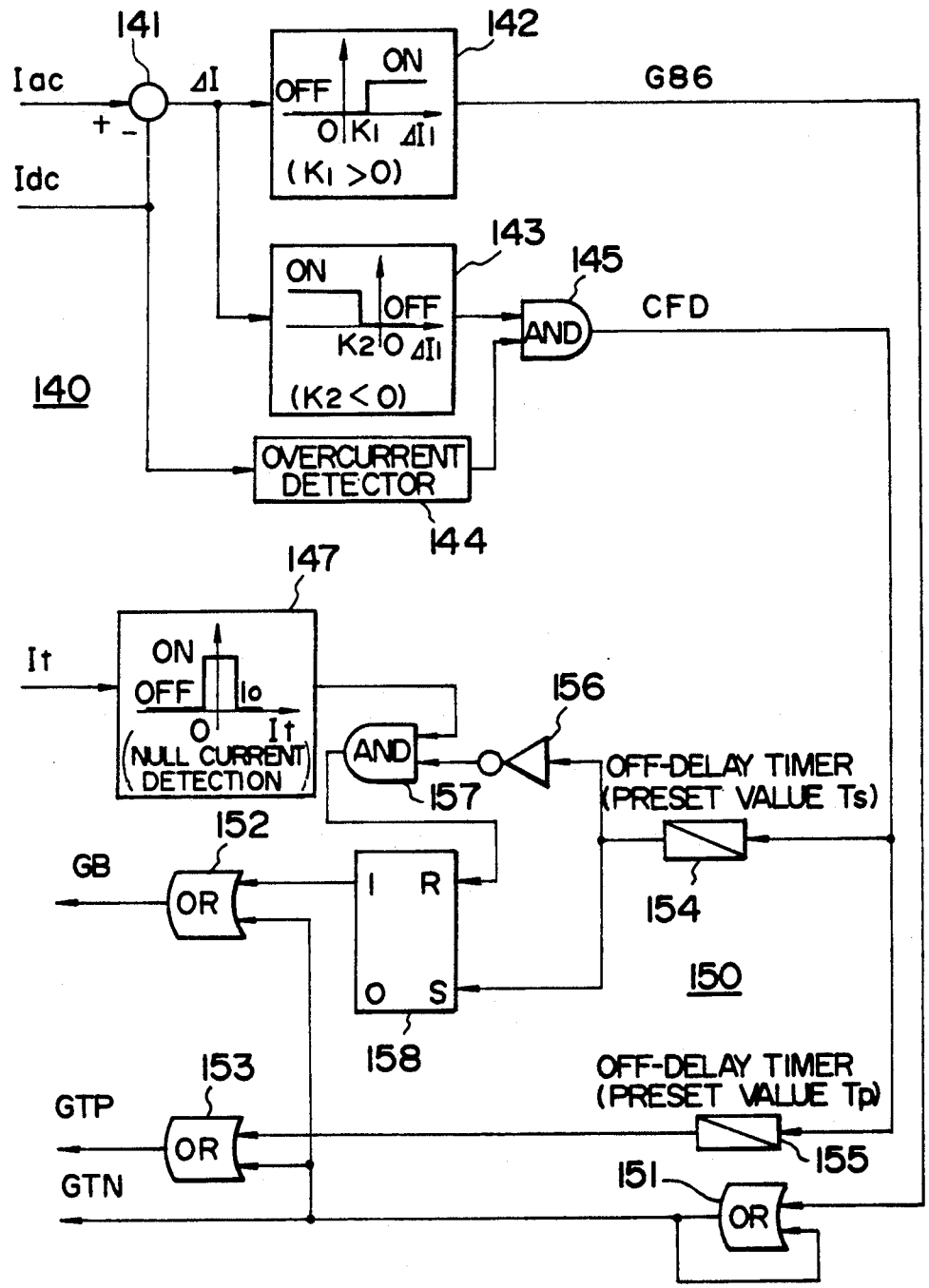
FIG. 6 is a block diagram showing an example of a protection interlocking device which is suited to the construction of the third embodiment of the present invention.

FIG. 5 shows the construction of the third embodiment of the semiconductor power conversion system according to the present invention.

The system of the embodiment illustrated in FIG. 5 is constructed so that electric power is fed from an AC system 1 to a three-phase bridge circuit 3 through a power transformer 2. A protection interlocking device 29 is also present.

Likewise to the bridge of FIG. 1, the three-phase bridge circuit 3 is so arranged that thyristors TY1–TY6 are semiconductor devices which have a controllable firing function and a reverse blocking characteristic, and are connected in the form of a bridge. A gate control circuit (firing command circuit) 12 which performs the firing controls of the individual thyristors TY1–TY6, is connected to the gates of these thyristors. On the DC side of the three-phase bridge circuit 3, a switch 4 identical to the first embodiment is connected in parallel therewith.

This embodiment is constructed similarly to the first embodiment, except that the short-circuit terminator detector and the protection interlocking device are different. Here, the points of difference will be chiefly described.

In this embodiment, the DC voltage transformer 15 shown in FIG. 1 is replaced with a DC current transformer 28, which detects the current It of the short-circuiting switch 4 and applies it to the protection interlocking device 29.

In the same manner as in the first embodiment, the protection interlocking device 29 supplies the gate control circuit 12 with a blocking command GB as a signal for controlling the operation/stop of the thyristors TY1–TY6 and supplies short circuiting command circuits 13a and 13b with short-circuiting commands GTP and GTN for the short-circuiting thyristor switches TYSP 4a and TYSN 4b of the switch 4, respectively.

Like the protection interlocking device 14 shown in FIG. 2, the protection interlocking device 29 of this embodiment includes a detecting function section 140 which detects an internal fault, etc., and a control signal output function section 150 which produces control signals, such as the blocking command, depending on the detected results. The protection interlocking device 29 of this embodiment differs from the device 14 shown in FIG. 2, in that the detecting function section 140 has a comparator 147 instead of the comparator 146 depicted in FIG. 2.

When the absolute value of the current detection value It of the short-circuiting switch 4 detected by the DC current transformer 28 is within a preset value lo, the comparator 147 is turned "on" to detect the fact that the short-circuit current has decreased to the extent that no short-circuiting is required, namely, that it has become substantially null. The "on" operation of the comparator 147 results in the short circuiting command GTN being reset like the comparator 146. The preset value lo needs to be greater than the detection error of the short-circuit current.

The semiconductor power conversion system of this embodiment operates similarly to the embodiment shown in FIG. 1, except that the method of detecting the short-circuit release is different.

This fourth embodiment is a system which operate when an overvoltage has developed on the DC side of a three-phase bridge circuit. It is constructed similar to the first embodiment as shown in FIG. 1, except that the construction of the protection interlocking device 14 is different. Here, the point of difference will be chiefly described with reference to FIG. 7.

Figure 7:
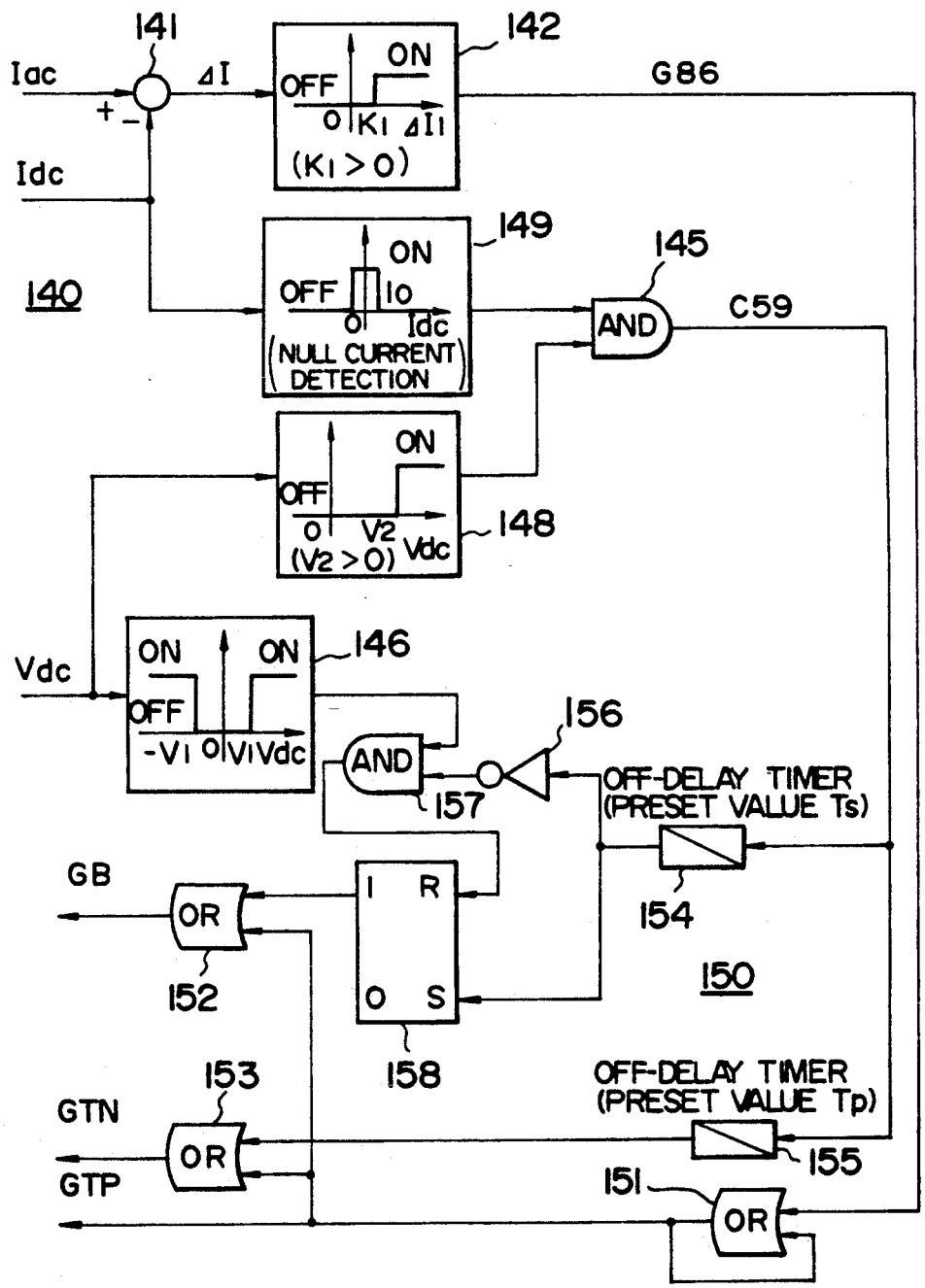
FIG. 7 is a block diagram showing an example of a protection interlocking device which is suited to the construction of the fourth embodiment of the present invention.

FIG. 7 shows the construction of an example of the protection interlocking device which is well suited to this embodiment.

In the protection interlocking device of this embodiment, an overvoltage detector is provided instead of a commutation failure detector, but the construction of the remainder of the device is substantially the same as in FIG. 2. Accordingly, emphasis shall be put on this difference.

The protection interlocking device of this embodiment is furnished with the overvoltage detector which is constructed having comparators 148 and 149 and the AND circuit 145.

The comparator 149 functions as a null current detector which is turned "on" when the absolute value of the DC output current Idc detected by the DC current transformer 6 is within a preset value Io. The comparator 148 is a comparator with a sign, which is turned "on" when the DC output voltage Vdc is greater than a preset value V2. A case where both the comparators 148 and 149 are turned "on", signifies a situation where the DC voltage Vdc is substantial when the direct current Idc null. Therefore, it is determined that the overvoltage has developed due to an abnormality on the side of the DC load U, and an overvoltage detection signal C59 is produced from the AND circuit 145.

The control signal output function section 150 has the same arrangement as in FIG. 2, except that the short circuiting command GTN is delivered from the OR circuit 153, while the short-circuiting command GTP is delivered from the OR circuit 151.

The overvoltage detection signal C59 is held for the preset time period Ts by the off-delay timer 154 so as to produce the blocking command GB. The preset time period Ts is set to be, at least, longer than the turn-off time of each of the thyristors TY1-TY6. On the other hand, regarding the short-circuiting signals, only the signal GTN for short-circuiting the switch 4b is outputted so that the overvoltage detection signal C59 is held for the preset time period Tp by the off-delay timer 155. The preset time period Tp is set to be longer than the sum of the turn-on time of the short-circuiting switch 4a and the operation delay time of the gate control circuit 13b so that the short-circuiting operation is initiated without failure.

The comparator 146, functioning as the short-circuit termination detector, is turned "on" when the absolute value of the DC side voltage signal Vdc is the preset value V1 or above. The preset value V1 needs to be greater than the forward voltage drop of the switch 4a constituting the short circuiting switch 4. The output signal of the comparator 146 upon detection the opening or turn-off of the short-circuiting switch 4 is applied as the reset signal of the flip flop circuit 158 so as to reset the blocking command GB.

Since this embodiment additionally has the direct current detection as one of the conditions of the overvoltage protection operation, it has the effect of rendering the circuit less prone to erroneous short-circuiting operations.

Figure 8:
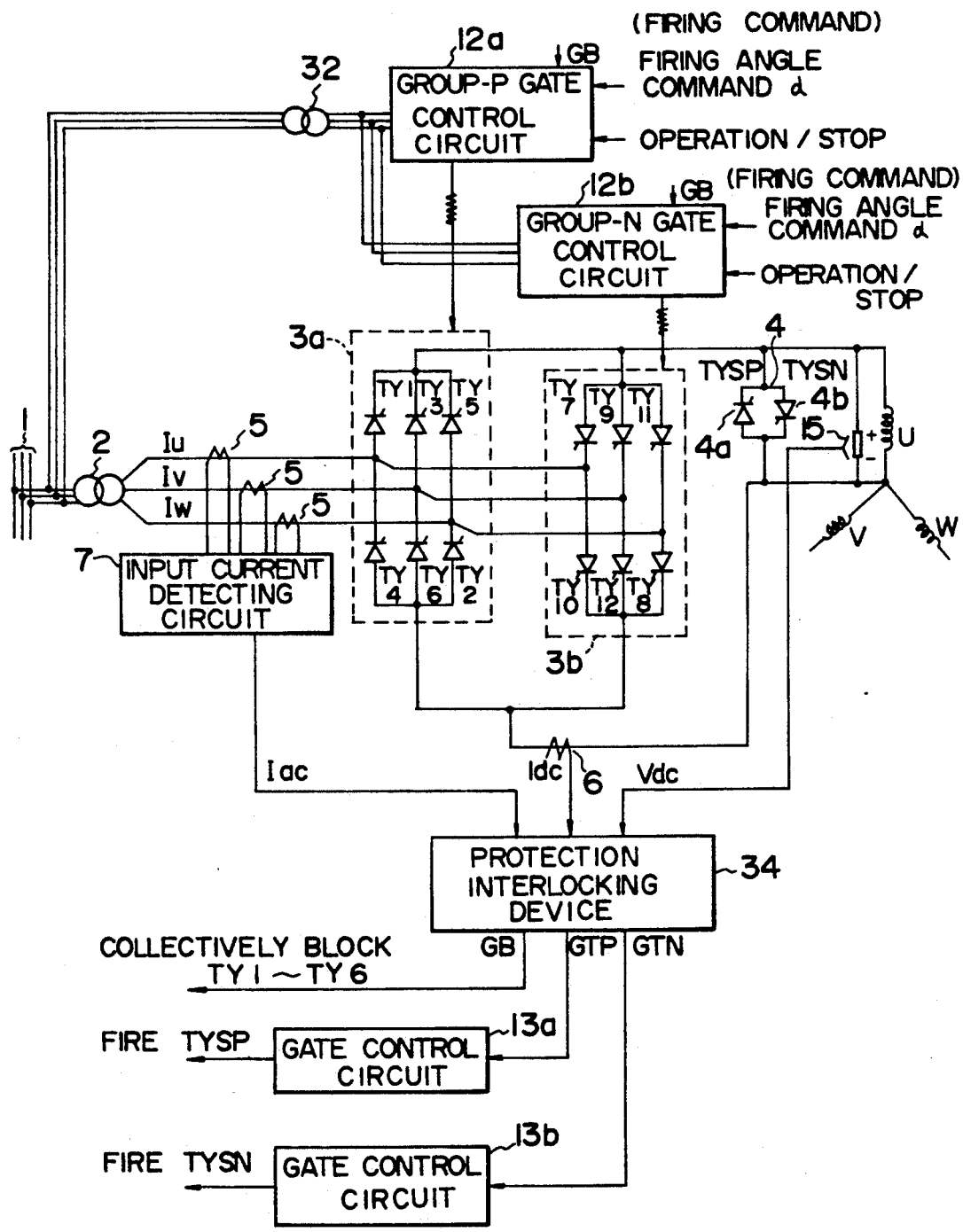
FIG. 8 is a circuit diagram showing the construction of the fifth embodiment of the present invention.

The fifth embodiment is an example in which the present invention is applied to a non-circulating current type cycloconverter. More specifically, as shown in FIG. 8, this embodiment comprises three-phase bridges 3a and 3b which are connected in a reverse parallel relationship to each other. Like the embodiment shown in FIG. 1, it also has an input current detecting circuit 7 connected through current transformers 5 on the primary side thereof and has a short-circuiting switch 4, a DC current transformer 6 and a DC voltage transformer 15 connected on the secondary side thereof.

The three-phase bridges 3a and 3b are connected to common AC buses, and are respectively subjected to firing controls by gate control circuits 12a and 12b in accordance with commands sent from a control calculation unit not shown. Thus, the former bridge 3a supplies the secondary side with currents in a positive direction, and the latter bridge 3b with currents in a negative direction.

Although only the U-phase will be referred to here in this embodiment, each of the other V- and W-phases is similarly That is, circuit arrangements as described in this embodiment are juxtaposed for the three phases U, V and W, and the outputs of the respective circuit arrangements are connected to the secondary side of a load, for example, a variable-speed generator/motor.

The short-circuiting switch 4 is so arranged that two thyristors TYSN 4a and TYSN 4b are connected in a reverse parallel relationship to each other, which have a controllable firing function and a reverse blocking characteristic. Gate control circuits 13a and 13b are respectively connected to the switches 4a and 4b so as to on/off control them.

In addition, a protection interlocking device 34 is connected to the output sides of the input current detecting circuit 7, DC current transformer 6 and DC voltage transformer 15 which produces a blocking command GB and short-circuiting commands GTP and GTN. The blocking command GB is sent to the gate control circuits 12a and 12b. The short-circuiting commands GTP and GTN are respectively sent to the gate control circuits 13a and 13b.

Figure 9:
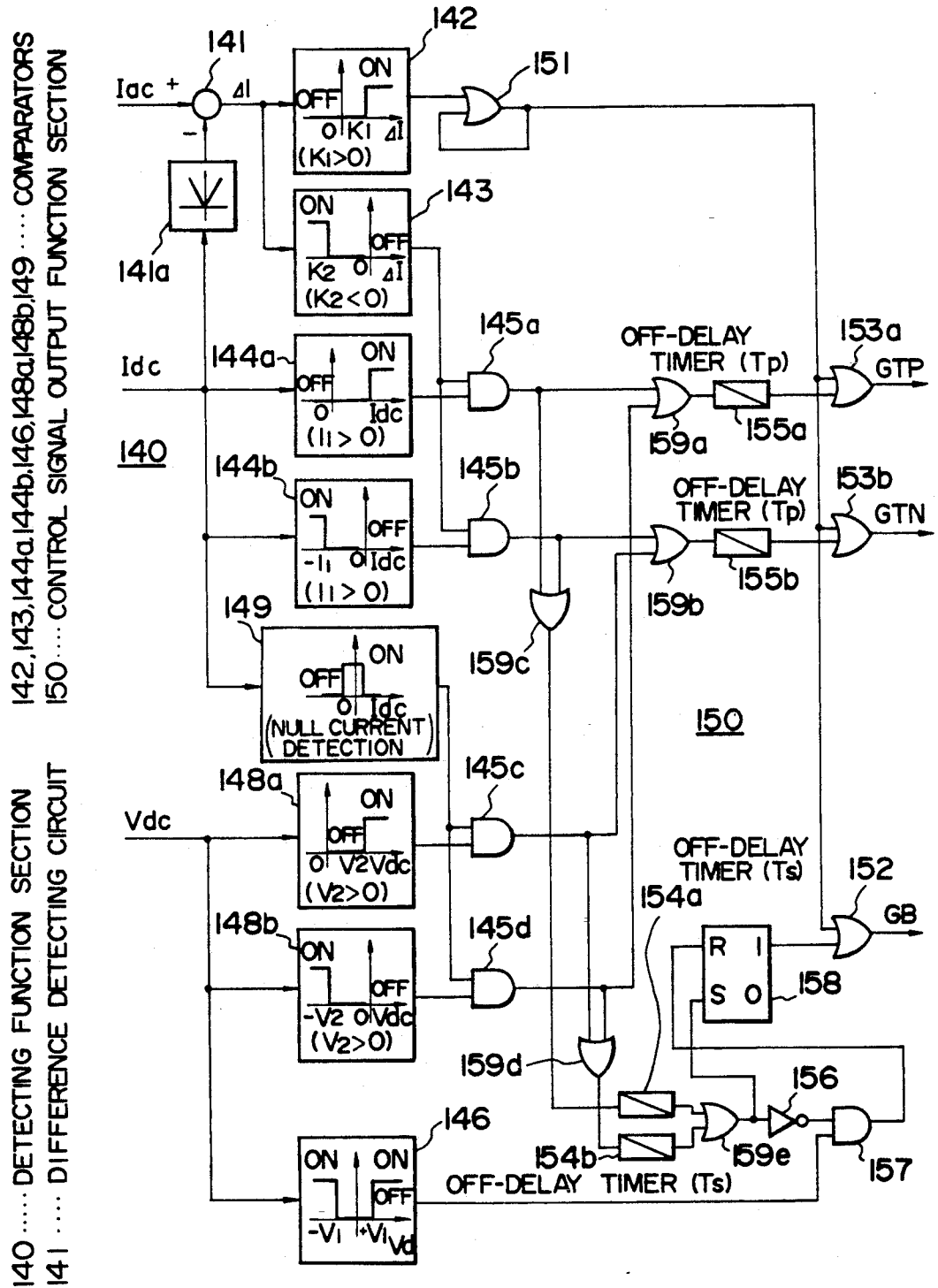
FIG. 9 is a block diagram showing an example of a protection interlocking device which is suited to the construction of the fifth embodiment of the present invention.
Figure 10:
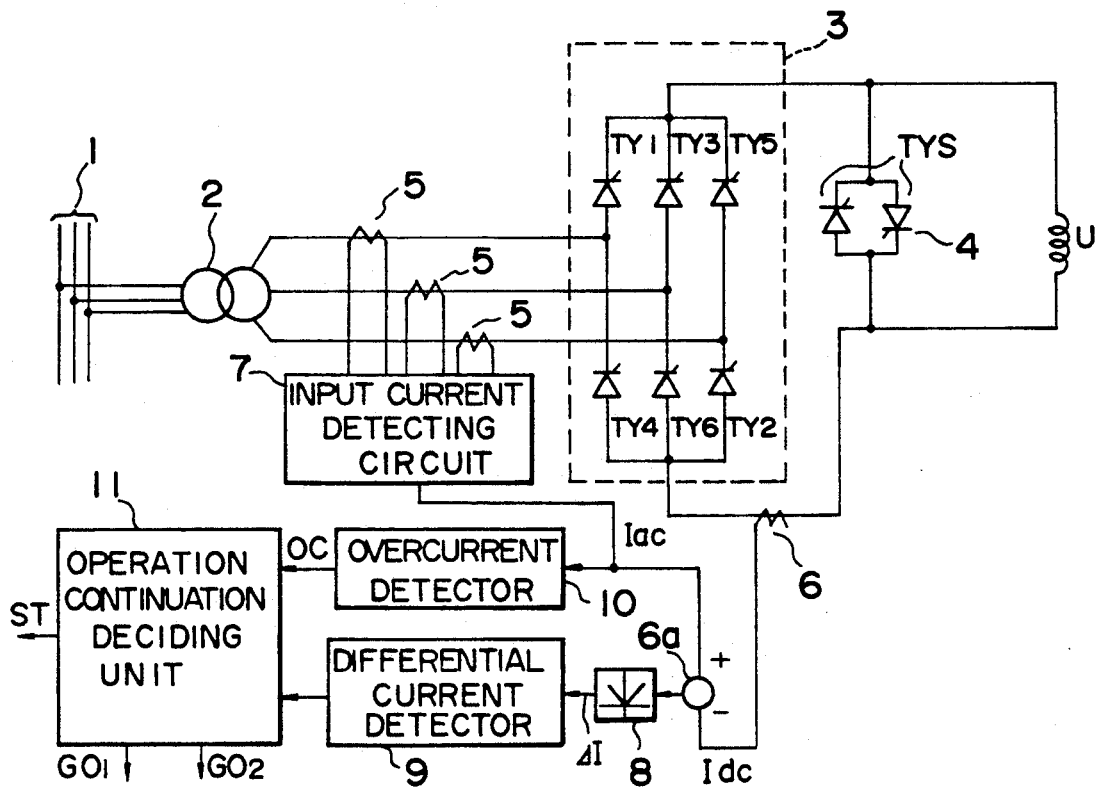
FIG. 10 is a circuit diagram showing the construction of a semiconductor power conversion apparatus in the prior art.

An example of the protection interlocking device 34 well suited to this embodiment is described with reference to FIG. 9.

Like the other protection interlocking devices described above, the protection interlocking device of this embodiment is constructed having a detecting function section 140 and a control signal output function section 150.

The detecting function section 140 includes an absolute value calculator 141a which finds the absolute value of a secondary side output current Idc, a difference detecting circuit 141 which finds the difference ΔI between the above absolute value and the absolute value Iac of an AC input current, a comparator 142 which functions as an internal fault detector, comparators 143, 144a, 144b and AND circuits 145a, 145b which function as commutation failure detectors, comparators 149, 148a, 148b and AND circuits 145c, 145d which function as overvoltage detectors, and a comparator 146 which functions as a short-circuit release detector.

The control signal output function section 150 includes an OR circuit 151 which holds the output of the comparator 142, an OR circuit 159a which takes the logical sum of the outputs of the AND circuits 145a and 145d, an OR circuit 159b which takes the logical sum of the outputs of the AND circuits 145b and 145c, an OR circuit 159c which takes the logical sum of the outputs of the AND circuits 145a and 145b, and an OR circuit 159d which takes the logical sum of the outputs of the AND circuits 145c, and 145d. Besides, this control signal output function section 150 includes an off-delay timer 155a in which the output of the OR circuit 159a, namely, the detection signal of a commutation failure or an overvoltage, is held for a preset time period Tp, an off-delay timer 155b in which the output of the OR circuit 159b, namely, the detection signal of a commutation failure or an overvoltage, is held for the preset time period Tp, an off-delay timer 154a in which the output of the OR circuit 159c, namely, the detection signal of the commutation failure is held for a preset time period Ts, an off delay timer 154b in which the output of the OR circuit 159d, namely, the detection signal of the overvoltage is held for the preset time period Ts, an OR circuit 159e which takes the logical sum of the outputs of the off-delay timers 154a and 154b, an inverter 156 which inverts the output of the OR circuit 159e, an AND circuit 157 which takes the logical product of the outputs of the comparator 146 and the inverter 156, a flip-flop circuit 158 which is set by the output of the OR circuit 59e, namely, the detection of the commutation failure or overvoltage and which is reset by the output of the AND circuit 157, namely, the detection of a short circuit release, an OR circuit 152 which takes the logical sum of the output of the OR circuit 151 and that of the flip-flop circuit 158 so as to produce the blocking command GB, an OR circuit 153a which takes the logical sum of the output of the OR circuit 151 and that of the off-delay timer 155a so as to produce the short-circuiting command GTP, and an OR circuit 153b which takes the logical sum of the output of the OR circuit 151 and that of the off-delay timer 155b so as to produce the short-circuiting command GTN.

Here, the comparator 144a as well as the AND circuit 145a and the comparator 144b as well as the AND circuit 145b are used for constructing the commutation failure detectors, while the comparator 148a as well as the AND circuit 145c and the comparator 148b as well as the AND circuit 145d are used for constructing the overvoltage detectors. The reason therefor is that, since the currents in the positive direction and the negative direction flow on the secondary side, the commutation failures and the overvoltages are respectively detected with regard to both the currents. Accordingly, each of the commutation failure detectors or the overvoltage detectors functions as the commutation failure detector or the overvoltage detector in any of the foregoing embodiments, except for polarities.

Also, the other constituent elements are constructed similarly and function similarly to the corresponding elements in any of the foregoing embodiments. Therefore, they shall not be explained here.

In this embodiment, when the comparator 142 has detected the internal fault in the way stated before, the internal fault detection signal is held by the OR circuit 151. Further, the short-circuiting command GTP is produced from the OR circuit 153a, the short-circuiting command GTN from the OR circuit 153b, and the blocking command GB from the OR circuit 152.

When the comparators 143 and 144a have detected the commutation failure attributable to the three-phase bridge circuit 3a or when the comparators 149 and 148b have detected the overvoltage attributable to the three-phase bridge circuit 3b, the off-delay timer 155a is started, and the output thereof is delivered as the short-circuiting command GTP from the OR circuit 153a. On the other hand, when the comparators 143 and 144b have detected the commutation failure attributable to the three-phase bridge circuit 3b or when the comparators 149 and 148a have detected the overvoltage attributable to the three-phase bridge circuit 3a, the off-delay timer 155b is started and the output thereof is delivered as the short-circuiting command GTN from the OR circuit 153b.

Farther, when the output of any of the AND circuits 145a-145d is at the high level, the off-delay timer 154a or 154b is started, causing the flip-flop circuit 158 to be set and the blocking command GB is delivered from the OR circuit 152. In this case, when the ceasing of a short-circuit has been detected by the comparator 146 subject to the turn-off of the off-delay timer 154a or 154b, the flip-flop circuit 158 is reset and the delivery of the blocking command GB is terminated. When the preset time periods are held at Ts>Tp as beforehand, the three-phase circuits 3a and 3b are restored to steady operation states after the turn off of the short-circuiting switch 4.

Even in the case where the currents in the positive direction and in the negative direction flow on the secondary side, only the switch requiring short-circuiting is short-circuited, and erroneous short-circuiting operations are avoided.

Moreover, in this embodiment, the internal fault detections, commutation failure detections and overvoltage detections can be performed for the two three-phase bridge circuits by employing the detectors used in the embodiment shown in FIG. 1, without any special additional detector merely by altering the protection interlocking device. The operation of the cycloconverter can be consequently optimized.

Although this embodiment is described with reference to two three-phase bridge circuits are connected in the reverse parallel relationship, the present invention is not limited thereto. By way of example, the present invention is also applicable to a non-circulating current type of cycloconverter in which each of which two three-phase bridge circuits connected in series, are connected in the reverse parallel relationship to each other.

The present invention is not restricted to the embodiments described above.

For example, the input current detecting circuit 7 can be arranged having a sample-and-hold portion in which the AC input currents detected by the current transformers 5 are sampled at a preset period, an A/D conversion portion which subjects the sampled current values to analog-to-digital conversions, a highest value detecting portion which finds the absolute values of the obtained digital current values in the respective phases and which detects the maximum value of ut portion which delivers the highest value obtained to the circuit of the succeeding stage, an a control portion which controls the aforementioned portions. These portions can be implemented in the form of an IC.

The various functions can be realized for the respective phases independently of one another, but they can also be dealt with through time-division processing by the use of common resources.

In addition, a microprocessor can be built into the control portion or any other constituent, controllable by software, to provide a versatile protective device can be rendered versatile. By way of example, the microprocessor can be a CPU which executes computations and controls, a program memory which stores programs for controlling the operations of the CPU, a data memory which latches data processed by the CPU, and an I/O interface which processes signal inputs/outputs from and to the exterior of the microprocessor.

Further, each of the other constituent elements, for example, the protection interlocking device 14, gate control circuit 12 and short-circuiting command circuit 13 can be constructed of a digital circuit, especially an IC of heightened performance. Besides, the constituent element can be constructed of a data processor such as microcomputer similar to the input current detecting circuit 7.

A plurality of circuit elements may user a common data processor. By way of example, the application of a multiprocessor system is considered.

Besides, the protection interlocking device can also be configured different than shown in any of the foregoing embodiments as long as the same functions are performed. The protection interlocking device can be formed by properly combining the functions of the foregoing embodiments. By way of example, the commutation failure detector and the overvoltage detector can be combined.

Although three-phase bridges have been referred to in the embodiments, the present invention is not restricted to the three phases. Besides, although the abnormality of the bridge circuit itself has been exemplified as the internal fault of the bridge circuit, the present invention is not restricted thereto, but it is also applicable to a fault with the firing command loop including the gate control circuits. In this case, means for detecting a pulse anomaly may be provided.

The present invention can be extensively utilized for the controls of an induction machine, a synchronous machine, etc., DC power transmission, AC-to-DC conversion, DC-to-AC inversion, and so forth.

As one application example, a variable-speed generator/motor set can be mentioned. This equipment is constructed having a generator/motor whose primary side is connected to an AC system, and a power conversion system which is configured of power control devices of reverse parallel connection receiving electric power from the AC system and supplying secondary currents to the secondary side of the generator/motor. By way of example, the equipment is well suited to a pumping-up power station in which, while running a pumping water wheel or the like at a variable speed, it controls an active power output and a reactive power output to provide stable outputs even in case of an abrupt change on the AC system side.

What is claimed is:

1. A semiconductor power conversion system comprising:
   a multiphase bridge circuit which includes semiconductor devices having a controllable firing function and a reverse blocking characteristic, a gate control circuit which gives firing commands to said semiconductor devices, a short-circuiting switch in which switching devices having a controllable firing function and a reverse blocking characteristic are connected in a reverse parallel relationship to each other and are connected in parallel with a DC output side of said multiphase bridge circuit, and protection control means for performing a control for protecting said multiphase bridge circuit;
   said protection control means including
   means for detecting a commutation failure of said multiphase bridge circuit; and
   means for operating upon the detection of the commutation failure, to produce a blocking command for blocking the firing of said semiconductor devices of said multiphase bridge circuit and to produce a short-circuiting command for firing that one of said switching devices constituting said short-circuiting switch which bypasses the current of the commutation failure.

2. A semiconductor power conversion system according to claim 1, wherein said protecting control means further includes means for detecting ending of a short-circuit based on an expiration of current conduction of said short-circuiting switch and for halting the blocking of the firing of said semiconductor devices of said multiphase bridge circuit.

3. A semiconductor power conversion system according to claim 1, wherein said protection control means further includes:
   means for detecting a fault within said system attributed to either of said multi phase bridge circuit and a firing command loop therefor; and
   means for operating upon the detection of the internal fault, to produce a blocking command for blocking the firing of said semiconductor devices constituting said multiphase bridge circuit and to produce a short-circuiting command for those ones of said switching devices constituting said short-circuiting switch.

4. A semiconductor power conversion system according to claim 3, wherein said protection control means further includes means for detecting ending of a short-circuit based on the ceasing of current conduction of said short-circuiting switch and for halting the blocking of the firing of said semiconductor devices of said multiphase bridge circuit.

5. A semiconductor power conversion system according to claim 3, wherein said protection control means further includes means for detecting an overvoltage on the DC side of said multiphase bridge circuit, and means for operating upon the detection of the overvoltage, to produce a blocking command for blocking the firing of said semiconductor devices of said multiphase bridge circuit and to produce a short-circuiting command for firing that one of said switching devices constituting said short-circuiting switch in which the overvoltage forms a forward voltage.

6. A semiconductor power conversion system according to claim 5, wherein said protection control means further includes means for detecting a short-circuit release based on the ceasing of current conduction of said short-circuiting switch and for halting the blocking of the firing of said semiconductor devices of said multiphase bridge circuit.

7. A semiconductor power conversion system according to claim 1, wherein said protection control means further includes means for detecting an overvoltage on the DC side of said multiphase bridge circuit, and means for operating upon the detection of the overvoltage, to produce a blocking command for blocking the firing of said semiconductor devices of said multiphase bridge circuit and to produce a short-circuiting command for firing that one of said switching devices constituting said short-circuiting switch in which the overvoltage forms a forward voltage.

8. A semiconductor power conversion system according to claim 7, wherein said protection control means further includes means for detecting ending of a short-circuit based on the ceasing of current conduction of said short-circuiting switch and for halting the blocking of the firing of said semiconductor devices of said multiphase bridge circuit.

9. A semiconductor power conversion system comprising:
   a multiphase bridge circuit which includes semiconductor devices having a controllable firing function and a reverse blocking characteristic, a gate control circuit which gives firing commands to said semiconductor devices, a short-circuiting switch in which switching devices having a controllable firing function and a reverse blocking characteristic are connected in a reverse parallel relationship to each other and are connected in parallel with a DC output side of said multiphase bridge circuit, and protection control means for performing a control for protecting said multiphase bridge circuit;

said protection control means including:

means for detecting a fault within said system attributed to either of said multiphase bridge circuit and a firing command loop therefor;

means for operating upon the detection of the internal fault, to produce a blocking command for blocking the firing of said semiconductor devices constituting said multiphase bridge circuit and to produce a short-circuiting command for firing those ones of said switching devices constituting said short-circuiting switch;

means for detecting an overvoltage on the DC side of said multiphase bridge circuit; and means for operating upon the detection of the overvoltage, to produce a blocking command for blocking the firing of said semiconductor devices of said multiphase bridge circuit and to produce a short-circuiting command for firing that one of said switching devices constituting said short-circuiting switch in which the overvoltage forms a forward voltage.

10. A semiconductor power conversion system according to claim 9, wherein said protection control means further includes means for detecting ending of a short-circuit release based on the ceasing of current conduction of said short-circuiting switch and for halting the blocking of the firing of said semiconductor devices of said multiphase bridge circuit.

11. A semiconductor power conversion system comprising:

a multiphase bridge circuit which includes semiconductor devices having a controllable firing function and a reverse blocking characteristic, a gate control circuit which gives firing commands to said semiconductor devices, and a short-circuiting switch in which switching devices having a controllable firing function and a reverse blocking characteristic are connected in a reverse parallel relationship to each other and are connected in parallel with a DC output side of said multiphase bridge circuit;

wherein each of said switching devices constituting said short-circuiting switch has its impedance during its on operation set so as to be lower than a combined impedance of that path of said multiphase bridge circuit which is to be bypassed.

12. A method of operating a semiconductor power conversion system having a multiphase bridge circuit which includes semiconductor devices having a controllable firing function and a reverse blocking characteristic, a gate control circuit which gives firing commands to said semiconductor devices, and a short-circuiting switch in which switching devices having a controllable firing function and a reverse blocking characteristic are connected in a reverse parallel relationship to each other and are connected in parallel with a DC output side of said multiphase bridge circuit, comprising:

producing upon detection of a fault within said system attributed to either of said multiphase bridge circuit and a firing command loop therefor, a blocking command for blocking the firing of said semiconductor devices constituting said multiphase bridge circuit, and also a short-circuiting command for firing those ones of said switching devices constituting said short-circuiting switch;

producing upon detection of a commutation failure of said multiphase bridge circuit, a blocking command for blocking the firing of said semiconductor devices of said multiphase bridge circuit, and also a short circuiting command for firing that one of said switching devices constituting said short-circuiting switch which bypasses current of the commutation failure;

producing upon detection of an overvoltage on the DC side of said multiphase bridge circuit, a blocking command for blocking the firing of said semiconductor devices of said multiphase bridge circuit, and also a short-circuiting command for firing that one of said switching devices constituting said short-circuiting switch in which the overvoltage forms a forward voltage; and halting the blocking of the firing when ending of in a short-circuit said short-circuiting switch has been detected, in the case of the commutation failure or the overvoltage.

* * * * *